July 14, 1942.   A. A. FEHRENBACHER   2,289,768
SNOW SLED
Filed Nov. 22, 1940   2 Sheets-Sheet 1
FIG. 1.
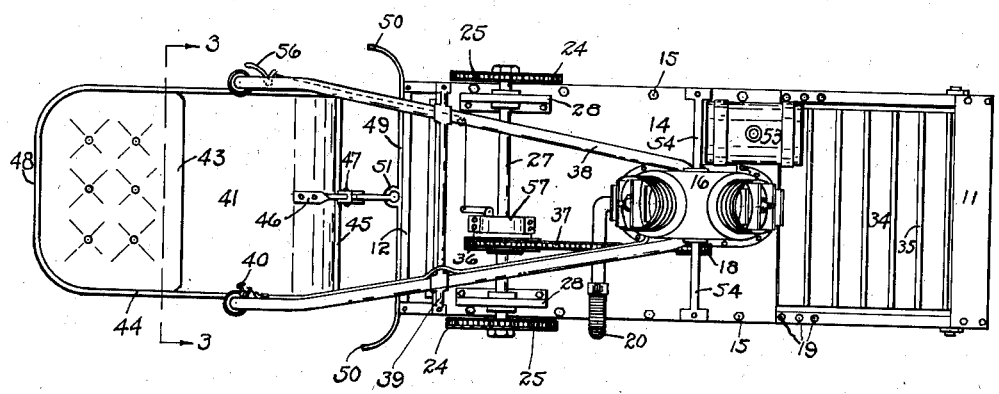
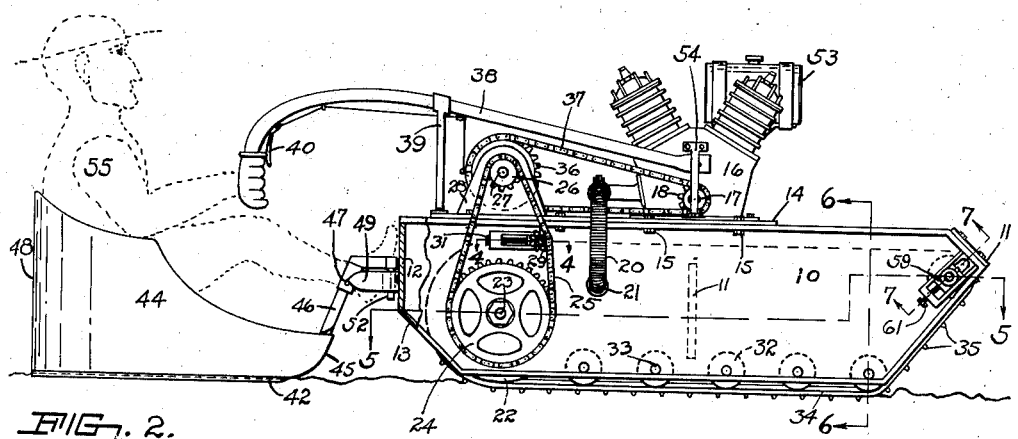
FIG. 2.
FIG. 4.
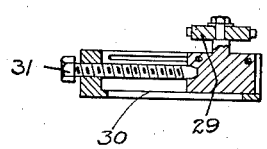
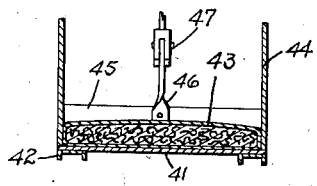
FIG. 3.
INVENTOR
A. A. FEHRENBACHER
BY
ATTORNEY July 14, 1942.  A. A. FEHRENBACHER  2,289,768
SNOW SLED
Filed Nov. 22, 1940  2 Sheets-Sheet 2
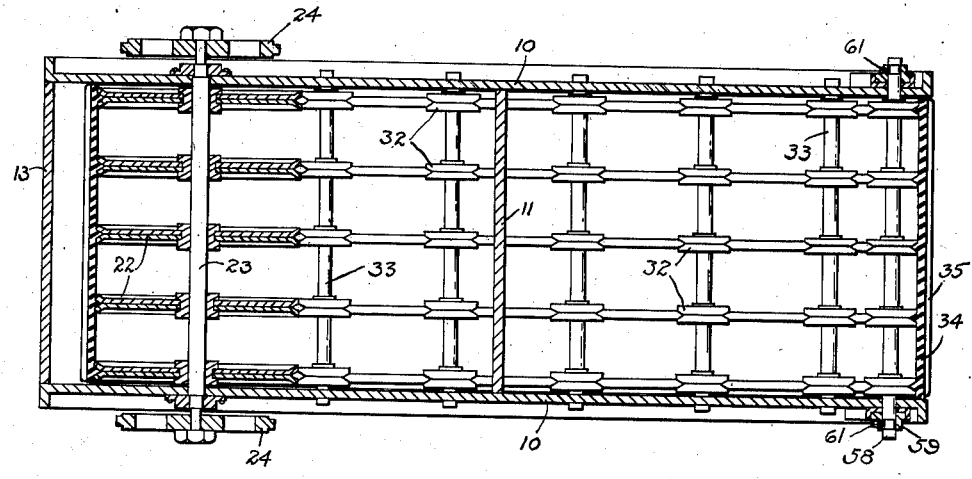
FIG. 5.
FIG. 6.
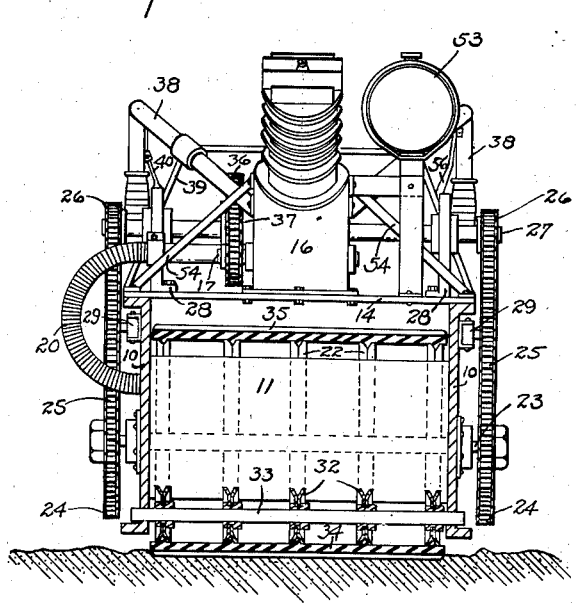
FIG. 7.
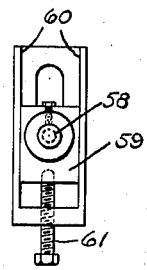
INVENTOR
A.A. FEHRENBACHER
BY
ATTORNEY Patented July 14, 1942

2,289,768

UNITED STATES PATENT OFFICE 2,289,768

SNOW SLED

Anton A. Fehrenbacher, Troutlake, Wash., assignor of one-third to John Fehrenbacher and one-third to W. P. Luttrell, both of Portland, Oreg.

Application November 22, 1940, Serial No. 366,515

3 Claims. (Cl. 180—5)

This invention relates generally to land travelling vehicles and particularly to a snow sled.

The main object of this invention is to construct a self-propelled vehicle adapted to travel over the top of snow.

The second object is to construct a vehicle of the class described which will be light in weight and easy to maneuver and capable of turning in a very short radius.

The third object is to construct a sled for a unit of the class described on which are provided keels or runners which hold the sled or passenger carrying unit against lateral movement.

The fourth object is to construct a device of the class described in which the tractor unit is exceptionally light in relation to the traction surface.

The fifth object is to construct a tractor unit of the class described in which the longitudinal center of balance may be readily adjusted to meet conditions of snow, terrain, load, etc.

The sixth object is to construct a device of the class described wherein the exhaust gases are discharged into the interior of the tractor for the purpose of preventing snow and ice from adhering to the parts of the tractor or the tread thereof.

These and other objects are accomplished in the manner set forth in the following specification as illustrated in the accompanying drawings, in which:

Fig. 1 is a plan of the entire device.

Fig. 2 is a side elevation of the device.

Fig. 3 is a vertical section taken along the line 3—3 in Fig. 1.

Fig. 4 is a section taken along the line 4—4 in Fig. 2.

Fig. 5 is a broken section taken along the line 5—5 in Fig. 2.

Fig. 6 is a section taken along the line 6—6 in Fig. 2.

Fig. 7 is a section taken along the line 7—7 in Fig. 2.

Similar numerals refer to similar parts throughout the several views.

Referring in detail to the drawings, there is shown a pair of side frames 10 which are held in spaced relationship by the cross ties 11 and the end members 12 and 13. A flat plate 14 is secured across the top of the frame by means of the bolts 15 and serves as a support for the motor 16.

A power take-off shaft 17 is provided with a sprocket wheel 18. The frames 10 are provided with a plurality of holes 19 to permit the motor 16 to move longitudinally to establish balance.

A flexible exhaust pipe 20 conducts gases from the motor 16 through the openings 21 in the side frames 10 to the interior of the tractor unit.

A plurality of grooved pulleys 22 are secured on the transverse shaft 23 which journals on the side frames 10. On the ends of the shaft 23 are secured the sprocket wheels 24 whose chains 25 pass around the sprocket pinions 26 on the counter shaft 27 which journals in the frame 28 on the plate 14.

A chain tightening sprocket wheel 29 is slidably mounted on the guide 30 and is positioned by means of the screw 31. The smaller grooved pulleys 32 are mounted on the transverse shaft 33 which is disposed between the lower edges of the frames 10. A web belt 34 is preferably of rubber tire material, and provided with ribs 35 which mesh with the pulleys 32 and 22.

The shaft 27 is provided with a sprocket wheel 36 whose chain 37 is driven from the sprocket wheel 18. A pair of handle bars 38 are secured to the motor unit 16 and are further supported by the braces 39. The usual controls 40 for the motor 16 are provided on the handle bars 38.

Turning now to the sled unit same will be seen to consist of a flat bottom 41 under whose edges are disposed the channel plates 42 which act as keels for holding the bottom 41 from moving sideways.

A cushion 43 is provided on the top side of the bottom 41 and the sides 44 extend around the back and sides of the sled member in order to protect the rider from snow and afford shelter therefrom.

The front end 45 of the sled unit is upturned and has a standard 46 projecting therefrom to which is attached the hitch connection 47 by means of which the sled 48 is attached to the tractor unit.

Against the end member 12 is secured the foot rest bar 49 provided with the backwardly turned ends 50. An eye 51 is formed in the center of the bar 49 to receive the pin 52 of the hitch. Obviously any suitable form of hitch may be employed without departing from the spirit of this invention.

The usual fuel tank 53 and motor braces 54 are also indicated.

The operation of the device is as follows:

The driver 55 occupies the sled 48 and rests his feet upon the foot rest bar 49. The steering is accomplished by pressure of the hands on the handle bars 38 or by pressure of the feet on the members 50 or by the use of both of these devices.

A suitable clutch control lever 56 is provided and preferably operates through one of the handle bars 38 which serves as a guard therefor. Any other conventional form of disc clutch 57 may be used between the motor 16 and the shaft 27.

The chain tightening sprocket wheel 29 is essential in view of the fact that the position of the motor 16 on the frames 10 may be varied to meet the required condition of balance. Since all of the controls are mounted on the plate 14, they will naturally move with the motor 16 and the flexible exhaust pipe 29 will adapt itself to changing positions.

In Fig. 7 is shown the means for tightening the belt 34 wherein the shaft 58 journals in the bearing 59 which is slidably mounted between the guides 60. The bearing 59 is positioned by means of a screw 61. The guides 60 are secured to the side frames 10.

While I have thus illustrated and described my invention, it must, of course, be understood that I do not intend to limit myself to the precise form of the device illustrated herein but I do intend to cover all such forms and modifications as fall fairly within the appended claims.

I claim:

1. In a snow sled of the class described, the combination of a sled and a tractor unit of the crawler type attached to said sled and having one endless belt for a snow engaging member, a power unit for driving said belt, means for moving said power unit longitudinally along said tractor for the purpose of changing the center of balance and a handle extending rearwardly from said tractor to points above said sled.

2. In a snow sled of the class described, the combination of a tractor unit of the crawler type having an endless belt for a snow engaging member, a power unit for driving said belt, means for moving said power unit longitudinally along said tractor for the purpose of changing the center of balance, and a flexible exhaust connection from said power unit to the interior of said tractor for the purpose of warming the snow engaging belt.

3. In a tractor of the class described, the combination of a pair of side frames having grooved rollers disposed between same and having one endless rubber belt provided with projecting ribs adapted to engage said rollers, a plate adjustably disposed across said side frames, a motor and driving connections mounted on said plate having a driving connection to said belt, handle bars rigidly attached to said plate whereby said tractor may be steered bodily by the occupant of the sled hitched behind said tractor.

ANTON A. FEHRENBACHER.